United States Patent

Friis

[11] Patent Number: 5,961,200
[45] Date of Patent: Oct. 5, 1999

[54] LAMP FOR USE IN CONNECTION WITH AN OBJECT STORAGE SYSTEM

[76] Inventor: Mogens Friis, Fasanvej 50, Viborg, Denmark, 8800

[21] Appl. No.: 08/875,633
[22] PCT Filed: Jan. 29, 1996
[86] PCT No.: PCT/DK96/00048
§ 371 Date: Sep. 29, 1997
§ 102(e) Date: Sep. 29, 1997
[87] PCT Pub. No.: WO96/25625
PCT Pub. Date: Aug. 22, 1996

[30] Foreign Application Priority Data

Jan. 30, 1995 [DK] Denmark .................................. 0104/95

[51] Int. Cl.$^6$ .................................................. A47B 97/00
[52] U.S. Cl. ............................ 362/132; 362/127; 362/133; 362/234; 362/249
[58] Field of Search ..................................... 362/127, 132, 362/133, 134, 154, 253, 125, 234, 249

[56] References Cited

U.S. PATENT DOCUMENTS

| | | | |
|---|---|---|---|
| 1,532,935 | 4/1925 | Patton . | |
| 1,928,151 | 9/1933 | Goldman | 362/125 |
| 2,415,055 | 1/1947 | Weiskopf | 362/133 |
| 4,231,625 | 11/1980 | Perez et al. . | |
| 4,368,507 | 1/1983 | Reynolds | 362/253 |
| 4,689,726 | 8/1987 | Kretzschmar | 362/127 |
| 4,939,625 | 7/1990 | Olson | 362/154 |
| 5,034,861 | 7/1991 | Sklenak et al. | 362/133 |
| 5,154,291 | 10/1992 | Sur | 362/154 |
| 5,205,638 | 4/1993 | Squitieri | 362/133 |
| 5,287,252 | 2/1994 | Caruso | 362/234 |
| 5,314,242 | 5/1994 | Ludlow | 362/154 |
| 5,437,504 | 8/1995 | Halvatzis | 362/125 |

FOREIGN PATENT DOCUMENTS

| | | |
|---|---|---|
| 0 132 533 | 2/1985 | European Pat. Off. . |
| 0 229 937 | 7/1987 | European Pat. Off. . |

*Primary Examiner*—Laura Tso
*Attorney, Agent, or Firm*—Jacobson, Price, Holman & Stern, PLLC

[57] ABSTRACT

A lamp for use in connection with an object storage system and intended for being connected to a current supply, the lamp including a lamp housing with at least one light source and a reflector member being at least partially included in a longitudinal extension of the lamp housing, the extension including a light opening. The at least one light source and the reflector member being so disposed as to illuminate, through the light opening, the exposed back sides of objects when stored in the storage system. An external width and height of the lamp housing is proportioned corresponding to the dimensions of such objects as are intended for being stored in the object storage system. Thereby a separate, removable lamp of the insertion type is objected. An illumination system including at least two such lamps, an object storage system as combined with at least one such lamp, and the use of the lamp for illuminating an object storage system is disclosed, too.

10 Claims, 2 Drawing Sheets

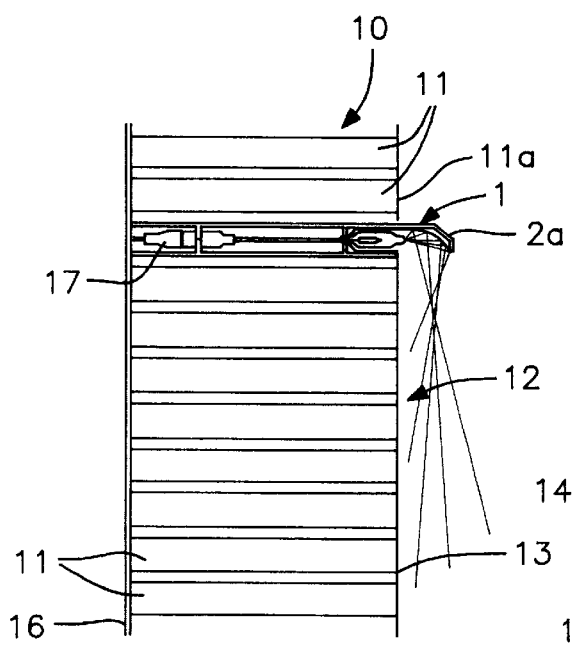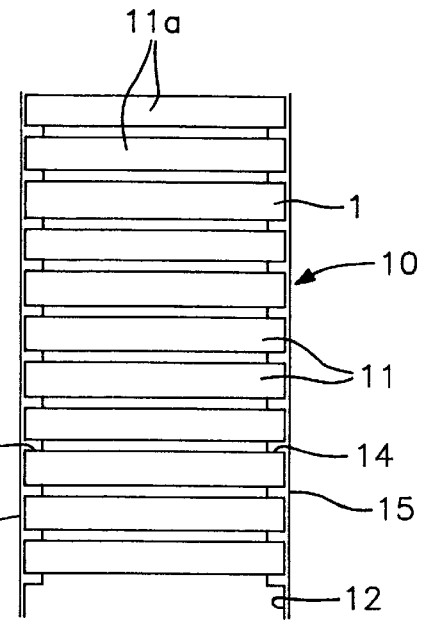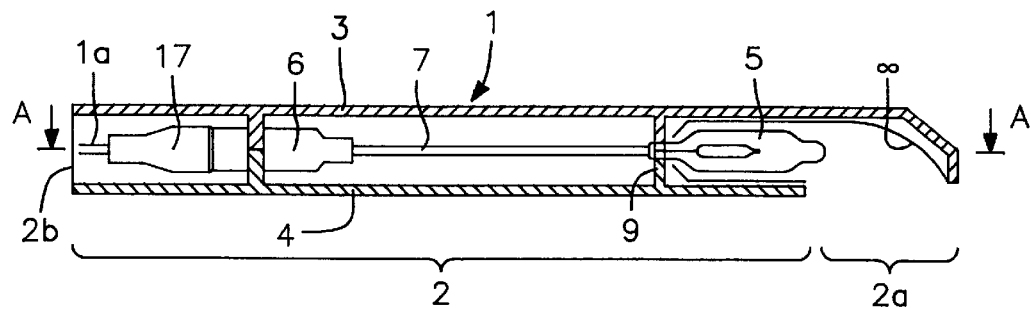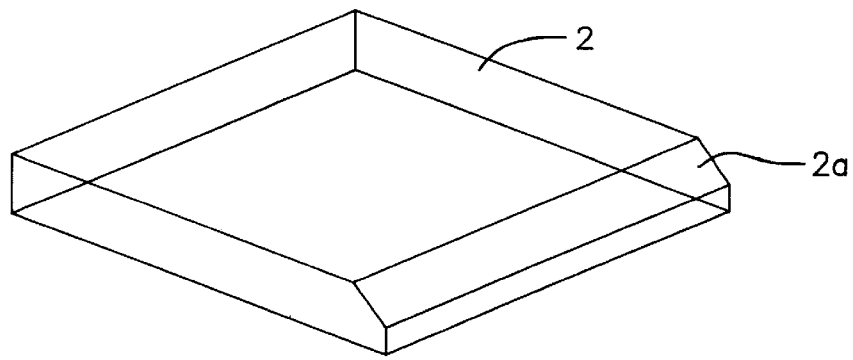

LAMP FOR USE IN CONNECTION WITH AN OBJECT STORAGE SYSTEM

TECHNICAL FIELD

This invention relates to a lamp for use in connection with an object storage system. The object storage system is for instance a storage cabinet for books, i.e. a bookcase, for records or tapes, and particularly for CD-cassettes or cartridges.

In general, lamps of this type serve the purpose of illuminating the back side of the objects, when inserted. This back side is often used for information purposes, viz. as to the contents of the object. This information is usually very compact and printed in small types. Therefore, in order to read this information, the back side has to be well illuminated. The room illumination as such does usually not suffice, and still further, the reader himself will shade the information.

Although intended for, i.e. usable for, the said use, the lamp of the invention is mountable in connection with kitchen cabinets, video players, car glove compartments, caravans or mobile homes and yachts, for the purpose of providing an information illumination.

2. Description of the Prior Art

A storage cabinet for CD-discs comprising a built-in, i.e. fixedly integrated, lamp is disclosed in EP-A1-0 229 937, said lamp comprising a light source, viz. a light bulb connected to a light conducting member. While primarily intended for the indication of whether a certain box does already contain a CD-disc or not, a special embodiment is also disclosed, in which the lamp serves the purpose of illuminating the front side of the storage cabinet. The light bulb is placed at the rear side of the storage cabinet, and in this special embodiment the light conducting member is passed, embedded in a housing member, across the upper side of the storage cabinet. The light conducting member protrudes slightly as compared to the front side of the cabinet and it is obliquely or slantingly cut with a view of providing a reflection in the direction along the front side of the cabinet. Accordingly, the house member is prolonged or extended as compared to the storage cabinet, and a light opening is also provided in said housing member.

A cassette tape storage cabinet for use in vehicles is disclosed in U.S. Pat. No. 4,231,625. One variant of this cabinet has a fixedly integrated lamp with a light bulb, which is mounted in an extension of the cabinet with a view to illuminating the exposed back sides of the cassettes through a light opening. No reflector is mentioned in connection with this known lamp.

These known storage systems having built-in light are complicated and therefore expensive to manufacture. Still further, they are intended only for the storage and illumination of a rather limited number of objects. Considering for instance storage of such objects as CD cassettes, a private collector of which might very well own hundreds of CD's, these known illuminated storage systems would be too expensive to buy. Besides, no simple and smart way of extending to a larger storage system seems readily apparent.

DESCRIPTION OF THE INVENTION

The above problems are remedied with the lamp according to the invention. The fact, that an external width and height of the lamp housing is proportioned corresponding to the dimensions of such objects as are intended for being stored in said object storage system, means, that the external dimensions of the lamp as such are within, i.e. smaller than or equal to, the corresponding dimensions of such objects, as are intended to be stored in said storage system.

Because of this characterising feature, the lamp of the invention is of the insert type and thereby removable, i.e. it may be placed at any position in the storage system, substituting an object. For instance, if desired, the lamp may also be moved from place to place. Accordingly a rather flexible system is provided, applicable in connection with any storage system without any constructional modifications, and besides the manufacturing costs are rather low, i.e. because of each and every electrical constituent part being a commercially available standard item. The incorporation of a circuit board further reduces the manufacturing costs. Accordingly, the utility as well as the design value of this system is high, i.a. because the lamp is very discreetly insertable in existing storage systems.

The lamp of the invention is a separate entity, i.e. not fixedly integrated into a particular storage system, and with this lamp an intense and direct illumination of the objects is obtained.

The current supply may be direct or alternating current, high- or low-voltage, line voltage or battery, if desired rechargeable, and the voltage may be transformed as desired. In particular, the cigarette lighter socket of a vehicle may be used in connection with a vehicle storage system. A current supply of the low-voltage type and involving galvanic separation is preferred.

The following light sources are applicable: Incandescent bulbs and/or light-emitting diodes and/or optical fibres and/or lighting wires and/or light conducting means. When low-voltage light sources are used, no authorisation according to the power current regulations is required. More than one light source may be used, connected-up in series or in parallel, depending on i.e. the desired light intensity. Preferably low-voltage incandescent bulbs and/or light-emitting high-power diodes are used. The individual light sources are preferably placed in a row along the front side.

The purpose of the reflector member is to direct the light in a direction so as to illuminate the exposed back sides of the objects. This is achieved when the light from the light sources is reflected mainly in a direction perpendicular to the plane of the objects, viz. in parallel with the front side of the storage system. Another important function, however, of the reflector member is to effectively carry-off heat from the lamp housing. The reflector member may be a bright, shining or glittering metal sheet or plate, which is formingly pressed or bent and attached to one or more inner walls of the extension of the lamp housing. The reflector member may be one integral unity or consist of two or more interconnected parts. Still further, a reflector member may be established by metalising one or more of said inner walls, for instance by an immersion or spraying coating process, or the inner walls may be painted using a reflecting paint, e.g. also white paint. The exact shape of the reflector member, viz. that of the metal plate or sheet or the boundaries of the coated or painted area, is in no ways restricted. For instance a metal plate or sheet in the shape of a segment of a sphere or paraboloid may be used. Still further, if desired, the metal plate or sheet may be profiled, corrugated or undulating.

By placing the reflecting material at the inside of the lamp housing extension, opposite to the light opening, a satisfactory reflection is obtained in the desired direction. Still further, by placing additional reflecting material at the light opening area, i.e. at the same inner wall surface, an improved reflection is obtained.

In a particular embodiment of claim 3; a separate lamp of the insert type and for use in connection with so-called CD-racks, viz. storage systems for CD-cassettes, is disclosed. The external dimensions of CD-cassettes are standarised as follows (b indicates the width, i.e. the width of the usually information carrying back side of the cassette, h indicates the height, i.e. the thickness of the cassette, and l indicates the length, i.e. the usual insertion depth in a storage system): b×h×l=125×10×140 (all indicated in mm). Cassettes for double-CD's have a height of 20 mm. In this embodiment, the construction is of utmost simplicity, comprising a box-shaped housing, viz. generally shaped like a CD-cassette itself.

The invention also relates to a lamp system or an illuminating system comprising more than one of said insert type lamps, and, optionally, a suitable current supply and the required electrical connecting wires; and to an object storage system, in particular a CD-rack, comprising at least one lamp according to claim 1. Finally, the invention relates to the use of a lamp for illuminating an object storage system.

BRIEF DESCRIPTION OF THE DRAWINGS

Below, the invention is described in more detail by reference to the drawings, illustrating an example of a lamp of the invention, viz. a particular embodiment thereof, intended for use in connection with a CD-rack.

The invention is not limited to the example shown, neither in respect of materials, constructional details, the number or type of component parts of the electrical system etc.

In the drawings,

Figure 4:
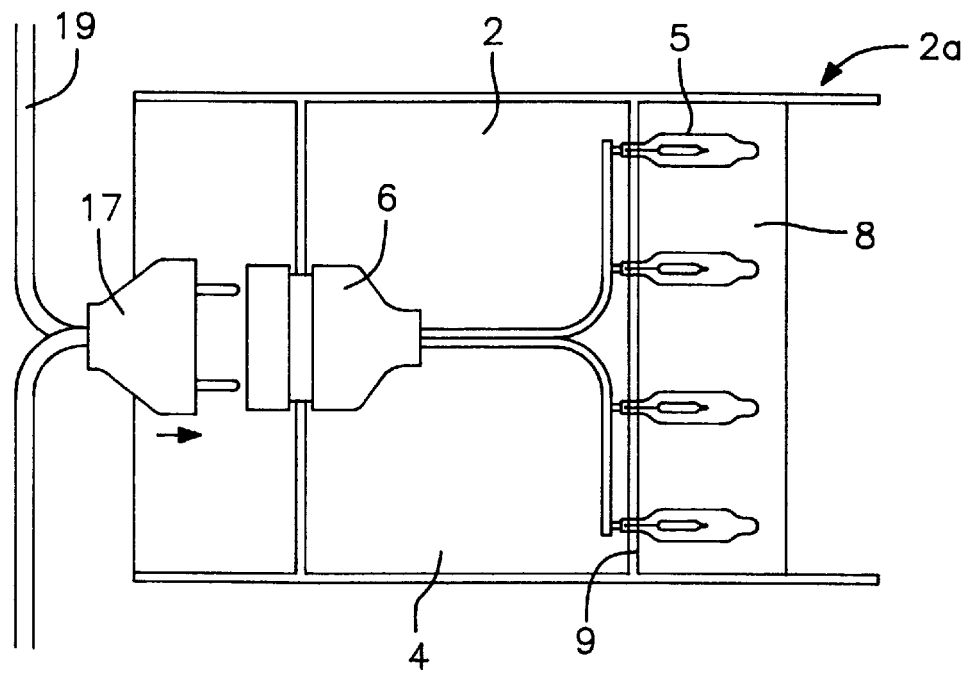
Figure 6:
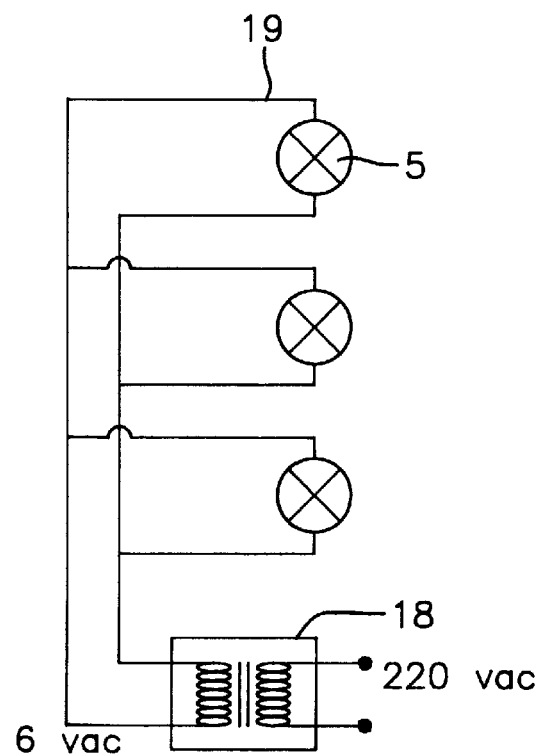

FIG. 1 illustrates a sectional view of a rack system, in which a lamp of the invention is inserted in one of the cassette compartments of the rack, FIG. 2 illustrates the same as in FIG. 1, but viewed from the front side, FIG. 3 an enlarged view of the lamp of FIG. 1 and 2, in longitudinal section, FIG. 4 a sectional view taken on line A—A in FIG. 3, FIG. 5 a perspective view of the lamp of FIG. 3 and 4, in a side view, and FIG. 6 is a diagram showing the electrical connection between the individual lamps in a illumination system consisting of several lamps according to the invention.

DETAILED DESCRIPTION OF THE PREFERRED EMBODIMENTS

FIG. 1 and 2 illustrate an example of a lamp 1 according to the invention as inserted in one of the cassette compartments 12 of a CD-rack 10. In the rack 10, several CD-cassettes 11 are also inserted, viz. inserted in parallel with their plane, via the open front side 13 of the rack. The lamp 1 is inserted just like a cassette. Ribs 14 separate the individual compartments 12 of the rack 10, said ribs being placed with an appropriate spacing at the inner sides of the two side walls 15 of the rack. At the hindmost end, the compartments 12 are terminated by vertical continuous profiles 16 along the side walls 15 in both sides, i.e. the back side is partially open. Other back side shapings exist, but protruding profile constructions or wall members always limit the backwards shifting of the cassettes. Accordingly, these profile constructions or wall members serve as stop means for the cassettes, so as to make the back side 11a thereof flush, when the cassettes are duly inserted in the rack.

When inserted, the CD-cassettes are placed in a side-by-side relationship in a horizontal (or vertical) position. Only the back sides 11a of the cassettes are visible from the outside.

The lamp 1 has a housing 2 in two parts, viz. an upper part 3 and a lower part 4. Between those parts, four low-voltage incandescent bulbs 5 (vide FIG. 4) are inserted, together with a socket 6 and various wire connections 7 between said socket and the individual incandescent bulbs 5, and a reflector member 8. The incandescent bulbs 5 share a joint socket moulding 9, forming part of the lower part 4.

Primarily, the housing 2 has the overall shape and dimensions of a standard type CD-cassette, i.e. having the external dimensions 125×140×10 mm, but because of an extension 2a, the housing 2 is made longer (deeper) than the CD-cassette 11, so as to make an extension part of said housing 2a protrude from the open front 13 of the rack, when the lamp is fully inserted into the cassette compartment 12. The extension 2a of the housing is provided with a reflector member, viz. an aluminium plate or sheet bent into an appropriate profile. This profile is incorporated between the two parts 3, 4 or halves of the housing. The incandescent bulbs 5 are mounted in the housing 2, very close to the extension 2a, and co-operate with the reflector so as to direct the light emitted by the incandescent bulbs downwards, along the open front 13 of the rack and approximately in parallel therewith (FIG. 1).

The sectional view of FIG. 4 shows the very compact placing of the incandescent bulbs, the reflector, the socket and the wires in the housing 2. The two parts 3 and 4 serve to fixing those parts, when the housing 2 is assembled. It is to be noted, that the socket 6, by which the lamp, via a joint distribution wire 19, comprising a wire plug 17 for each individual lamp 1, is connected to the central current supply of the system, is in a recessed position as compared to the back edge 2b of the housing 2. This enables the wire plug 17 to be inserted depressedly in a countersunk position, i.e. without taking up a lot of space outside the back edge 2b of the housing. This enables partly the unimpeded drawing of the wire 19 to the rear through the partially open back side of the rack, in the most suitable way (paying regard to the specific elaboration of the rack at this place), and partly it prevents the wire plugs 17 from protruding from the rear wall of the lamps 1, i.e. they are not in the way. The rack may still be placed close up to a wall or the like, unimpeded by the plugs, so as to conceal the wire connections between the individual lamps at the back side of the rack.

A CD-cassette rack may be designed for storing a rather large number of CD-cassettes, e.g. 50–100 in one single unit. A lamp such as the one shown on the drawings, is able to illuminate about 10–20 cassettes, but of course depending on the number of incandescent bulbs 5 in each lamp, the power thereof etc. Therefore, more than one lamp is often required in one and the same rack, for instance for each tenth or twentieth cassette. In FIG. 6, the connection of the individual lamps in a lamp system to a joint current supply 18 is shown. In FIG. 6, the current supply is a common linenet adapter, transforming the 220 V AC of said linenet into e.g. 6 V AC. The wire system may be concealedly drawn on the back side of the rack. In particular, if desired, an individual lamp might have a separate current supply.

EXAMPLE

Description of the Preferred Embodiment

A preferred variant of a lamp as shown on the drawings, intended for use in connection with a CD-rack, may be manufactured as follows:

The two parts 3 and 4 of the housing 2 are manufactured in an injection moulding process using a thermo plastic resin of the poly carbonate type, Lexan 121R, colour 701, which is manufactured by the company General Electrical, agent: Sunesen & Funch, Lyngby, Denmark. The housing is shaped as shown in FIG. 3 and 5 of the drawings, using a specially designed mould. The external dimensions of the housing are 125×10×158 mm.

The back edge 2b of the housing is recessed or retracted into the housing, thus establishing a compartment opening to the rear, with a view to accommodating the wire plug 17 and distribution wire 19 connection to the central current supply 18.

Four incandescent bulbs 5, Philips type 12818 (12 V, 3 W), and wire sockets 6 are mounted on a joint circuit board, establishing the electrical connection between lamps and socket. The circuit board is quite conventional, it is marketed for instance by the 3M company.

At the extension 2a of the housing, a switch of the finger touch type (impedance switch) is mounted. The corresponding electronics accessory is incorporated onto the circuit board. The circuit board is fixedly mounted between the two halves of the housing.

The reflector member, viz. bright, punched-out aluminium sheets of a shape as shown on FIG. 3 of the drawings, are inserted into the parts 3 and 4 of the housing covering the whole width thereof. The aluminium sheet is of the type Al 99,5 and the sheet thickness is 0.3 mm, semi-hard, rolled-bright surface. Supplier: The Granges company.

Finally, the two housing parts are assembled, preferably using a snap-lock-system (e.g. of the press-fit-type and particularly intended for disassembly, inter alia in connection with the change of the incandescent bulbs). But of course, the housing may also be assembled by thermo welding or using self-cutting screws.

When manufacturing a series of lamps for use in a lamp kit, only one of the lamps of the series has the said switch of the impedance-type, serving e.g. also the purpose of subduing the light (controlling the light intensity).

I claim:

1. A lamp for use in connection with an object storage system and intended for being connected to a current supply, said lamp comprising a lamp housing having at least one light source, a reflector member and a light opening, said at least one light source and said reflector member being disposed to illuminate, through said light opening, exposed back sides of objects when the objects and the lamp housing are stored in the storage system, and an external width and height of the lamp housing being proportioned corresponding to dimensions of such objects as are intended for being stored in said object storage system with a length of the lamp housing exceeding a length of the objects stored so as to overhang an edge of the storage system by extending from within the storage system and illuminating the objects stored in the storage system.

2. A lamp for use in connection with an object storage system and intended for being connected to a current supply, said lamp comprising a lamp housing having at least one light source, a reflector member and a light opening, said at least one light source and said reflector member being disposed to illuminate, through said light opening, exposed back sides of objects when stored in the storage system, and an external width and height of the lamp housing being proportioned corresponding to dimensions of such objects as are intended for being stored in said object storage system with the object storage system being a CD-rack for CD-discs so as to have the lamp housing overhang an edge of the storage system by extending from within the storage system and illuminating the CD-discs stored in the storage system.

3. A lamp according to claim 2, wherein a maximum height of the lamp housing is less than or equals 20 mm.

4. A lamp according to claim 2, wherein a maximum height of the lamp housing is less than or equals 10 mm.

5. A lamp according to claim 2, wherein a maximum width of the lamp housing is less than or equals 125 mm.

6. A lamp according to claim 1, wherein four incandescent bulbs constitute the at least one light source.

7. A lamp according to claim 1, wherein the at least one light source and an accessory wire socket are mounted on a joint circuit board, establishing an electrical connection between the at least one light source and the socket.

8. A lamp according to claim 1, wherein the lamp housing includes an upper part and a lower part, and joint socket moulding for the at least one light source.

9. An illumination system comprising at least two lamps according to claim 1.

10. An object storage system as combined with at least one lamp according to claim 1.

* * * * *